Van Gieson & Crooke.
Making Butt-Hinges.
N° 75320. Patented Mar. 10, 1868.

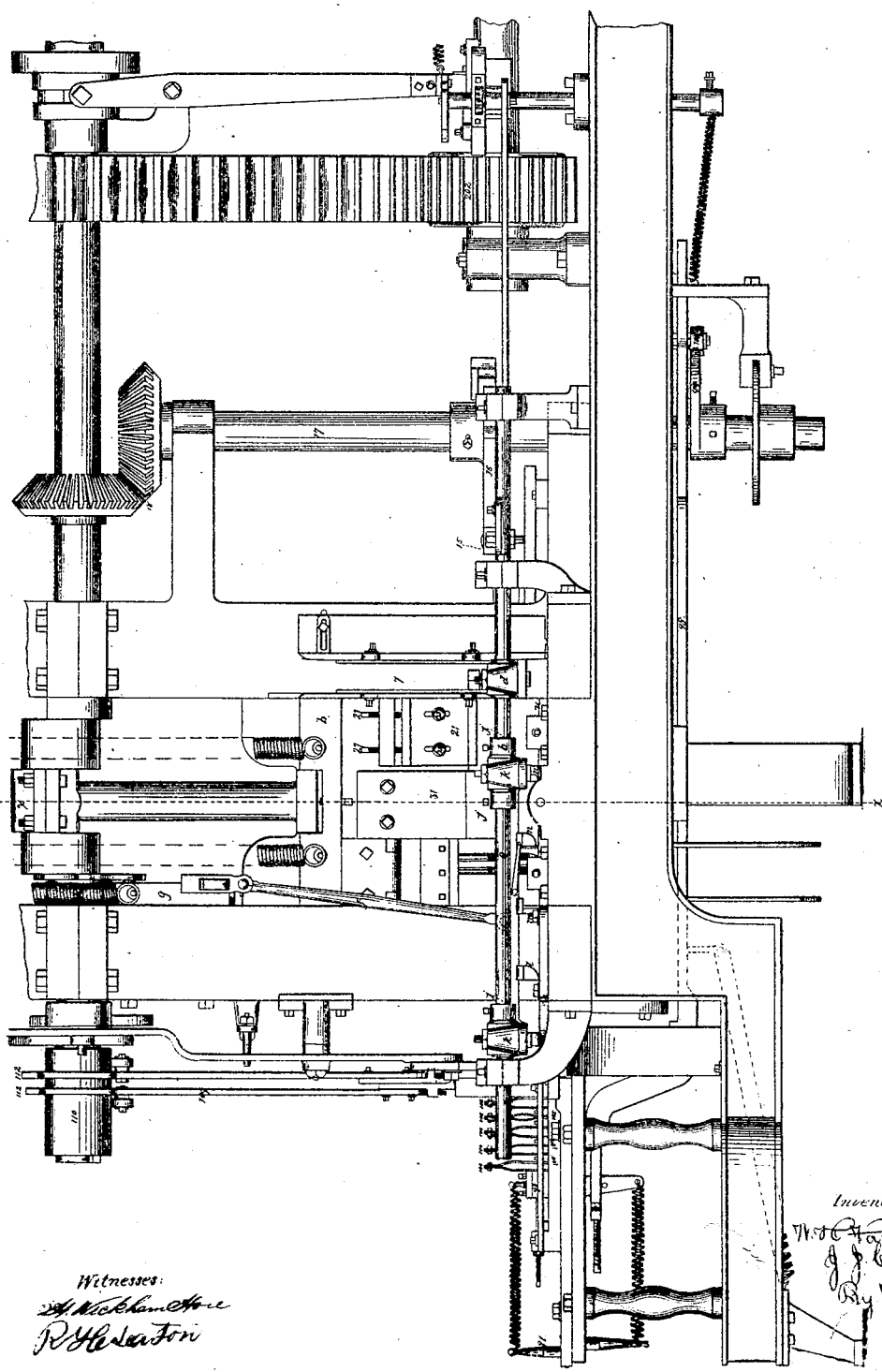

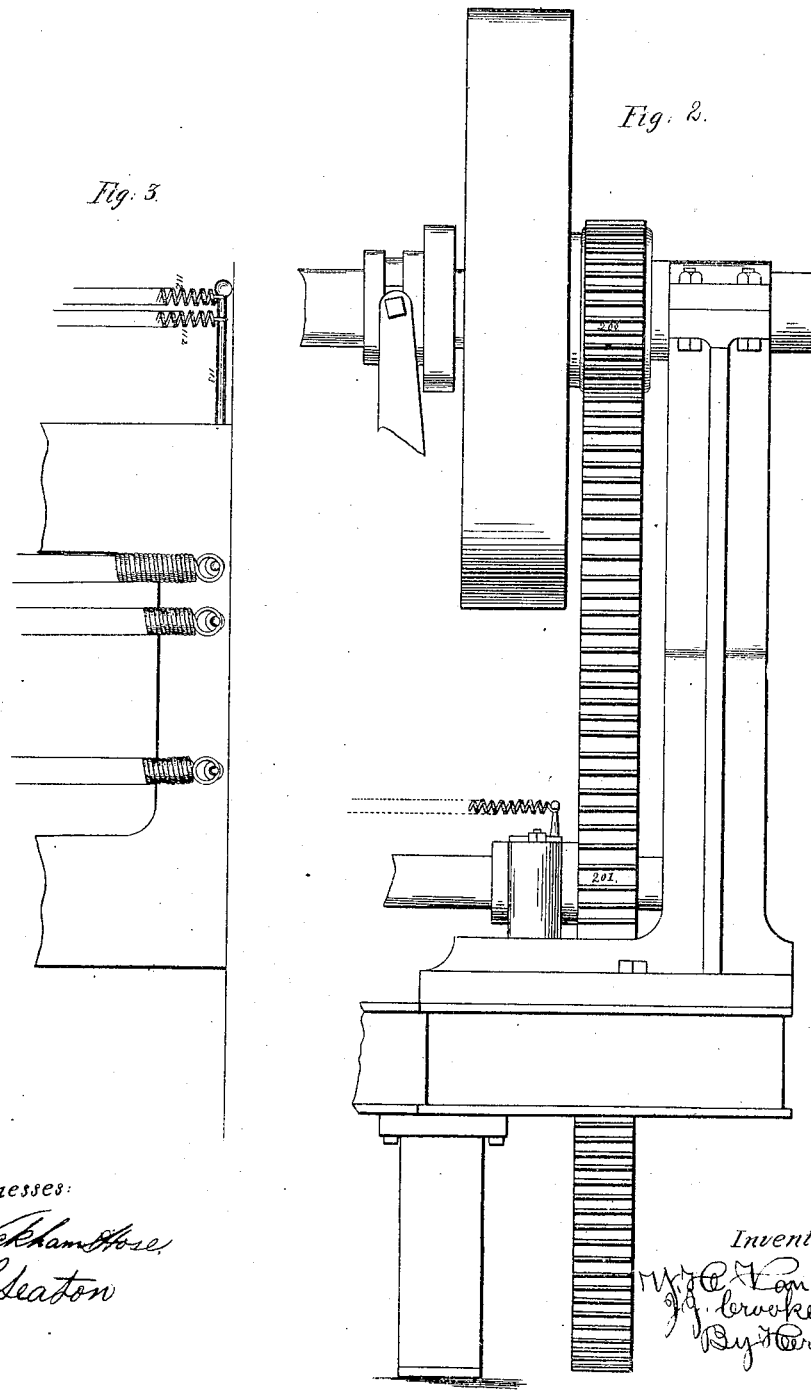

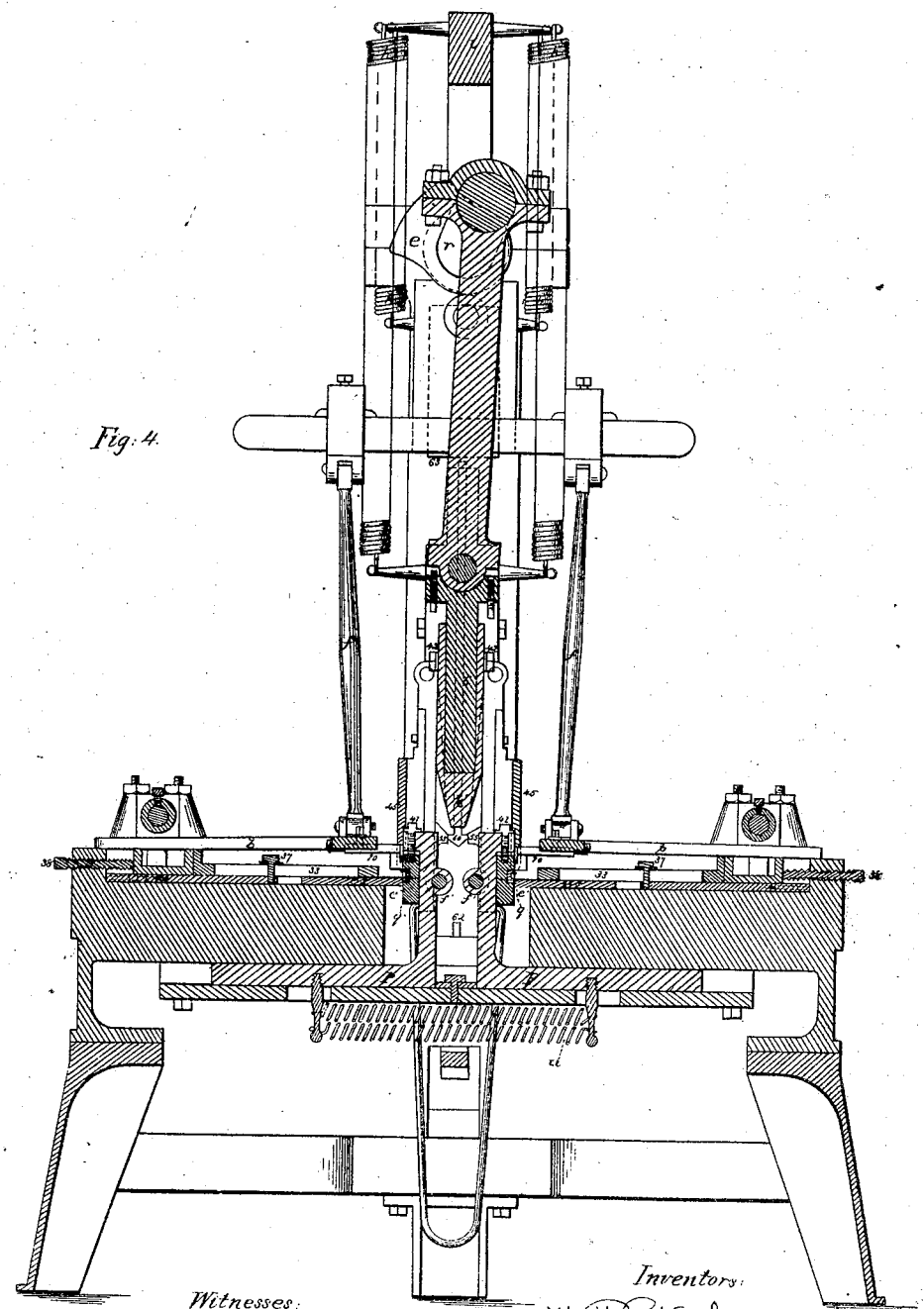

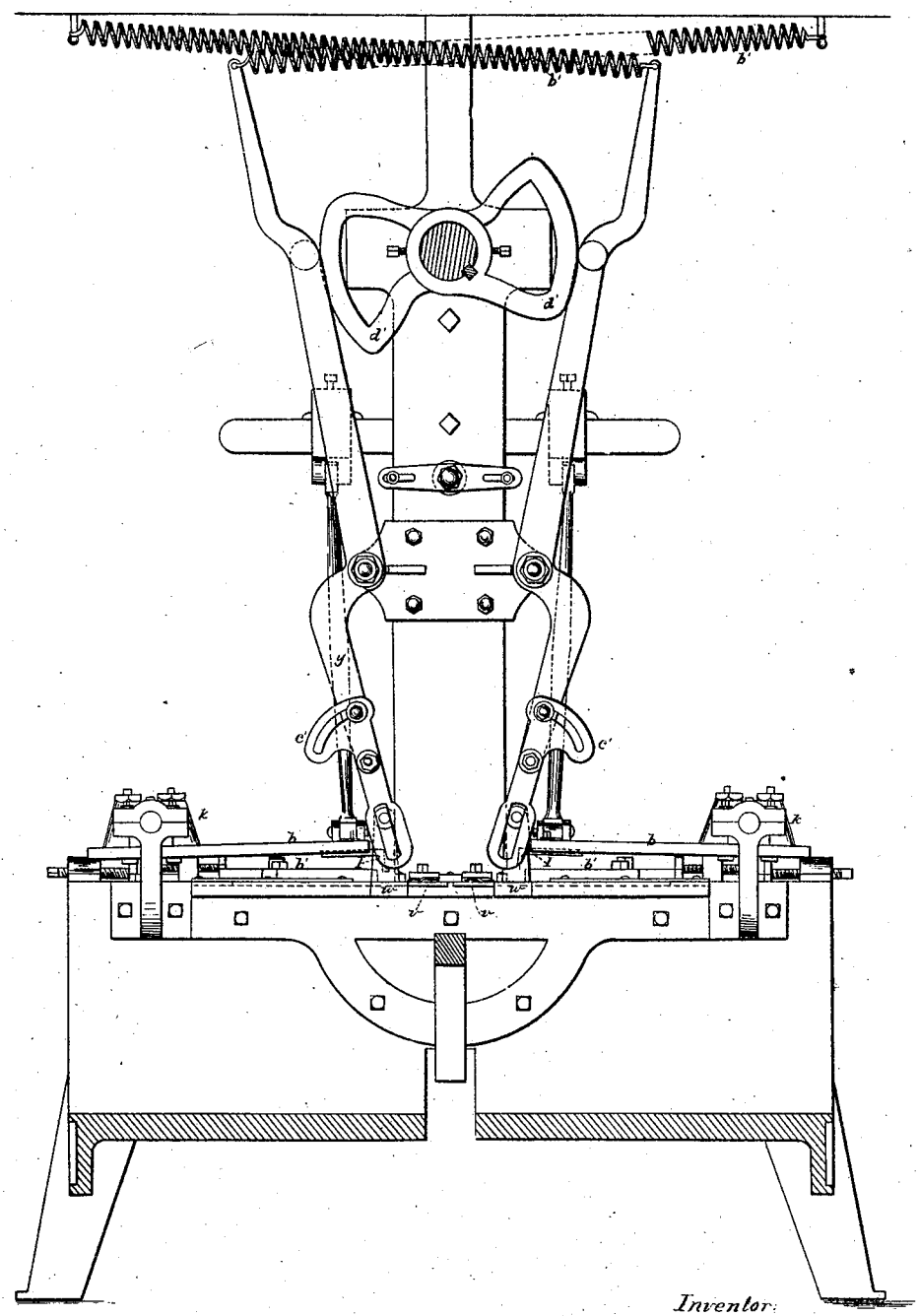

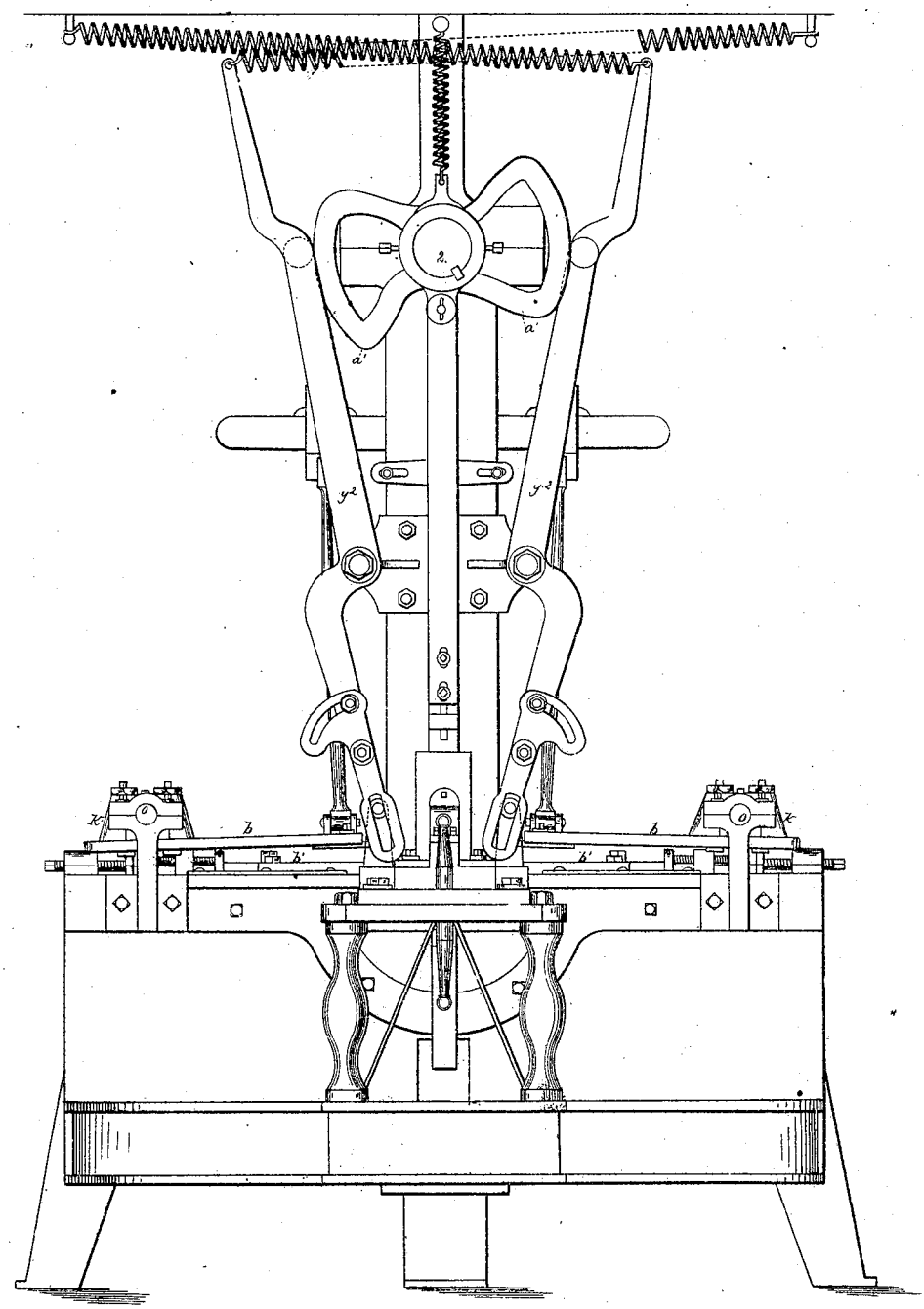

United States Patent Office.

WILLIAM H. VAN GIESON, OF PASSAIC, NEW JERSEY, AND JOHN J. CROOKE, OF NEW YORK, N. Y.

Letters Patent No. 75,320, dated March 10, 1868.

IMPROVED MACHINE FOR MAKING BUTT-HINGES.

The Schedule referred to in these Letters Patent and making part of the same.

Be it known that we, WILLIAM H. VAN GIESON, of Passaic, in the county of Passaic, and State of New Jersey, and JOHN J. CROOKE, of New York, in the county of New York, and State of New York, have invented certain new and useful Improvements in a Machine for Making Butt-Hinges; and we do hereby declare that the following is a full, clear, and exact description thereof, reference being had to the accompanying drawings, and to the letters of reference marked thereon.

Our invention relates to certain improvements in a machine for making butt-hinges, for which Letters Patent of the United States were granted to Edward Brown and William H. Van Gieson, on the ninth day of April, 1861; the object of the said improvements being to remove certain imperfections in the said machine, and cause it to operate with greater certainty and facility. They consist in, first, so constructing and arranging the carriers which carry the dies for turning the joints of the hinge, in connection with the other parts, that they shall have reciprocating rectilinear motion imparted to them, substantially as and for the purpose set forth; second, in an improved construction and arrangement of the slides, by which the two leaves of the hinge are taken, one from each side of the machine, after the joints are turned and filed, and carried to the wiring-device, whereby the machine is rendered more simple and certain in its operation. In the accompanying drawings—

Figure 1 is a side elevation of a butt-hinge machine, with our improvements applied thereto.

Figure 2 is a detail view of that portion of the said machine which is broken off from the right of fig. 1.

Figure 3 is a detail view of that portion of the top of the machine which is broken off in fig. 1.

Figure 4 is a vertical cross-section, showing the parts to the left of the line $x\,x$, fig. 1.

Figure 5 is a vertical cross-section, showing the parts to the right of the line $z\,z$, fig. 1, the wiring-device being removed.

Figure 7 is a front elevation of the said machine, with our invention applied thereto.

Figure 6:
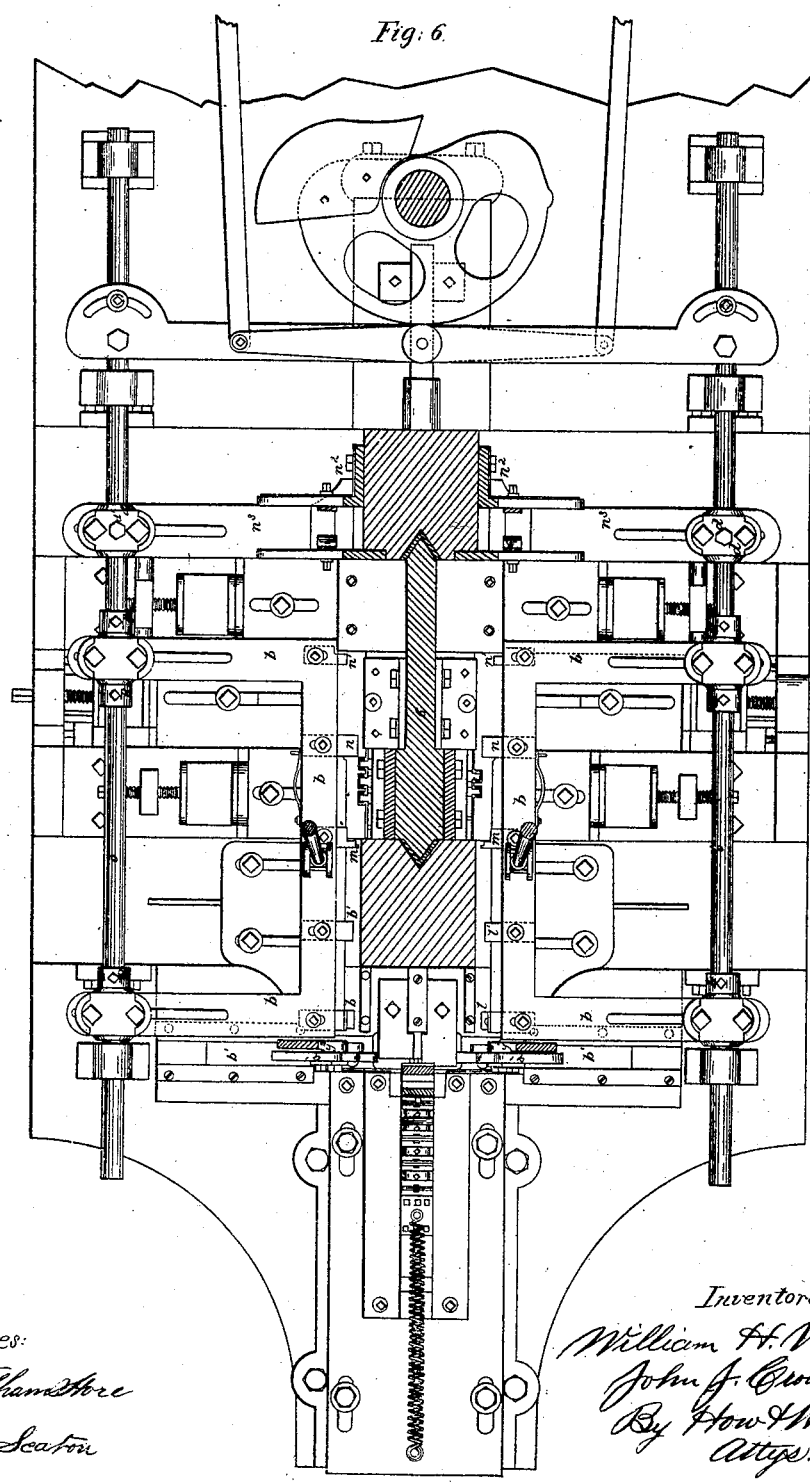
Figure 6 is a horizontal section, showing the parts below the line $y\,y$, fig. 1.

The principal part of the machine itself is identical with that described in the aforesaid Letters Patent. The improvements for which we desire to secure Letters Patent, and which constitute the present invention, we will proceed to describe, referring to the accompanying drawings, and to the letters and figures of reference marked thereon, as follows:

$l\,l'$, $m$, $n\,n^1$ and $n^2$, are the fingers which move the blanks or leaves forward, step by step, through that portion of the machine by which the joint of the hinge is turned and finished. These fingers, $l, l'$, $m$, $n$, and $n^1$, are secured to the frame B, which frame is hung on the sliding rod $o$, so as to allow it to turn freely thereon, while at the same time it is prevented from sliding lengthwise on the said rod, by the collars B B. The arm $n^3$, on which the finger $n^2$ is secured, is, on the contrary, fixed firmly and immovably on the rod $o$, by the set-screw $d'$, passing through the box or head $d$, and bearing against the rod $o$. The finger $n^2$ is flat, of a little less thickness than the blank, and slides under the pile of blanks in the hopper, removing the lowest blank in the pile, and delivering it to the finger $n^1$. The dimensions of this finger $n^2$ are such that it is still under the pile of blanks when it has completed its forward motion, so that the blanks cannot close down behind it as it moves forward. The frame $b$, to which the fingers $l\,l'$, $m$, $n$ and $n^1$ are attached, is raised, so as to clear the blanks or leaves during its backward motion, by the springs $h\,h$, and is lowered and held down, so as to catch the said blanks or leaves, and carry them forward during its forward motion, by means of the cam $e$, seen in fig. 4. This combination and arrangement of the fingers $l\,l'$, $m$, $n$ and $n^1$, frame $b$, cam $e$, and springs $h\,h$, by which the said frame and fingers are alternately raised and lowered, prevents the fingers from dragging the blanks back with them during their backward motion, while at the same time a sure and positive action of the fingers is insured, to bring the blanks or leaves forward, step by step, as desired.

P P, fig. 4, are slides which work in grooves P′ P′, being drawn together by the springs $u$, and forced apart by the wedge-shaped lower end, $k'$, of the gate 6. These slides carry the dies $e'\,e'$, which turn the joint of the hinge. The blank is carried in front of the dies $e'$ by the finger $n^1$, and its outer edge rests against the stop 3.3, thereby holding it firmly while the dies $e'$ are forced against the inner edge, and the joint is turned. The wedge-shaped lower end, $k'$, of the gate 6, in its descent, strikes the rollers $f'\,f'$, and in its further descent it forces the said dies against the blanks on either side, and thereby turns the joint part of each leaf into proper shape. By this motion of the dies, parallel or nearly so, with the surface of the blank, and perfectly straight and direct throughout, the joint is turned more perfectly, and with greater facility than heretofore.

$b'$ $b'$ are horizontal slides, to which the fingers for carrying the leaves to the wiring-device are attached. These slides are moved by the cams $a'$, acting on the levers $y^2$ alternately, inward and outward, and the motion of each lever is so timed by the position of the said cam on the shaft 2, with reference to the other parts of the machine, that a finished leaf is delivered in front of each slide $b'$, by the fingers $l$, as soon as the slides have completed their outward motion, where it is seized by the fingers attached to the said slides, and carried directly to the wiring-device, instead of being carried or pushed through a semicircular guide, and turned completely over, before being carried to the wiring-device.

By means of these improvements fewer parts are required, while the action is better, for which reason, as well as from the fact that these devices are, in themselves, more simple and certain in their operation, the machine is much better and cheaper, and produces hinges which can be sold at a lower rate.

The above description specifies our present invention, its operation and advantages, the machine sought to be improved being left, in other respects, as described in the Letters Patent already referred to, and it is, therefore, already well known.

Having thus fully described our invention, we claim—

1. The combination of transferring-fingers, with dies $e'$ $e'$, when said fingers and dies are operated by mechanism substantially as and for the purpose set forth.

2. The combination of the levers $y^2$, cam $a'$, and fingers $l$, with the slides $b'$ $b'$, the whole being arranged substantially as and for the purpose hereinabove specified.

Dated New York, February 11, 1867.

W. H. VAN GIESON,
JOHN J. CROOKE.

Witnesses:
    THOS. P. HOW,
    R. H. SEATON.